US010990351B2

(12) United States Patent
Babushkin

(10) Patent No.: US 10,990,351 B2
(45) Date of Patent: Apr. 27, 2021

(54) VOICE-BASED GRADING ASSISTANT

(71) Applicant: GICSOFT, Inc., Duluth, GA (US)

(72) Inventor: Igor Babushkin, Johns Creek, GA (US)

(73) Assignee: GICSOFT, INC., Duluth, GA (US)

( * ) Notice: Subject to any disclaimer, the term of this patent is extended or adjusted under 35 U.S.C. 154(b) by 0 days.

(21) Appl. No.: 16/274,693

(22) Filed: Feb. 13, 2019

(65) Prior Publication Data

US 2020/0257494 A1 Aug. 13, 2020

(51) Int. Cl.
*G06F 3/16* (2006.01)
*G06Q 50/20* (2012.01)
*G06F 40/205* (2020.01)
*G06F 40/289* (2020.01)
*G06F 16/11* (2019.01)

(52) U.S. Cl.
CPC ............ *G06F 3/167* (2013.01); *G06F 16/116* (2019.01); *G06F 40/205* (2020.01); *G06F 40/289* (2020.01); *G06Q 50/205* (2013.01)

(58) Field of Classification Search
CPC ............ G06F 17/20–289; G06F 3/167; G06F 40/174; G06F 16/84–88; G06F 3/16–167; G06Q 50/20–2057; G10L 15/26–265
See application file for complete search history.

(56) References Cited

U.S. PATENT DOCUMENTS

| | | | | |
|---|---|---|---|---|
| 8,738,396 | B2 * | 5/2014 | Green, III | G06F 19/328 705/2 |
| 2007/0185713 | A1 * | 8/2007 | Jeong | G10L 15/08 704/254 |
| 2008/0109453 | A1 * | 5/2008 | Bauer | G06Q 10/10 |
| 2012/0323574 | A1 * | 12/2012 | Wang | G10L 15/22 704/246 |
| 2013/0339030 | A1 * | 12/2013 | Ehsani | G10L 17/005 704/275 |
| 2015/0371637 | A1 * | 12/2015 | Neubacher | H04M 11/10 704/235 |
| 2016/0300573 | A1 * | 10/2016 | Carbune | G06F 40/174 |
| 2016/0321415 | A1 * | 11/2016 | Leonard | G16H 10/60 |
| 2017/0133010 | A1 * | 5/2017 | Printz | G10L 15/19 |

* cited by examiner

*Primary Examiner* — Beau D Spratt
*Assistant Examiner* — Liang Y Li
(74) *Attorney, Agent, or Firm* — Thomas | Horstemeyer, LLP

(57) ABSTRACT

Disclosed are various embodiments of a voice-based grading assistant. A first computing device can receive a voice command from a second computing device that identifies an assignment, a student, and a grade for the student for the assignment. The voice command is then processed by the first computing device to identify the assignment, the student, and the grade. Subsequently, the first computing device can enter a grade for the student for the assignment in a data store.

12 Claims, 3 Drawing Sheets

VOICE-BASED GRADING ASSISTANT

BACKGROUND

Educators often spend extensive time entering records. For example, educators may be required to keep attendance records, grade records for assignments (including different sets of records for different types of assignments), and potentially other records. These records are often recorded manually, either by hand in a notebook or ledger or keyed in manually through a computer-based record keeping application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for a voice-based grading assistant. Users, such as teachers or other educators or administrators, can dictate commands or instructions to a computing device. The computing device can enter grades for a student, update existing grades for a student, or otherwise modify student data or assignment data based on the voice commands. In order to correct for misidentification of voice commands or instructions, various embodiments of the present disclosure may allow compare the phonetic representation of a user input with the phonetic representation of expected user inputs. In the following discussion, a general description of the system and its components is provided, followed by a discussion of the operation of the same.

Figure 1:
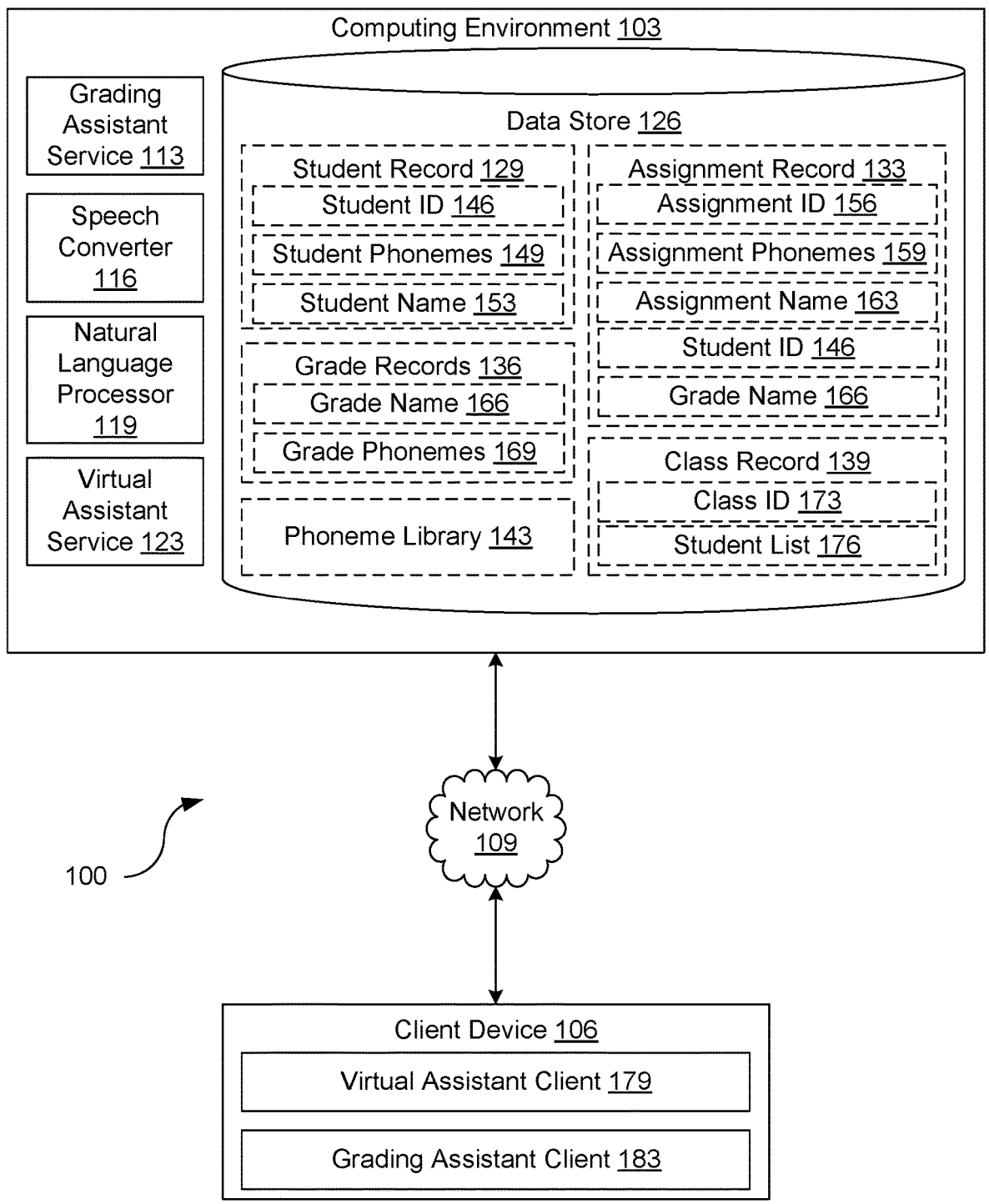
FIG. 1 is a drawing of a networked environment according to various embodiments of the present disclosure.

With reference to FIG. 1, shown is a networked environment 100 according to various embodiments of the present disclosure. The networked environment 100 includes a computing environment 103 and a client device 106, which are in data communication with each other via a network 109. The network 109 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may include a hosted computing resource, a grid computing resource or any other distributed computing arrangement. In some cases, the computing environment 103 may correspond to an elastic computing resource where the allotted capacity of processing, network, storage, or other computing-related resources may vary over time.

Various applications or other functionality may be executed in the computing environment 103 according to various embodiments. The components executed on the computing environment 103, for example, include grading assistant service 113, a speech converter 116, a natural language processor 119, a virtual assistant service 123, and other applications, services, processes, systems, engines, or functionality not discussed in detail herein.

The grading assistant service 113 is executed to create and modify records in a data store 126 in response to user voice inputs or voice commands. In some implementations, the grading assistant service 113 may work in coordination with other applications, such as the speech converter 116, the natural language processor 119, and the virtual assistant service 123. In other implementations, the functions of one or more of these applications may be included in and provided by the grading assistant service 113.

The speech converter 116 is executed to convert audio data containing speech into a text-based representation. For example, the speech converter 116 may receive an audio stream or audio file as an input and produce a text file containing a transcript of the audio stream or file as the output.

The natural language processor 119 is executed to process text files containing transcripts of natural language to identify user intents, commands, and other data. For example, the natural language processor 119 may process a text transcript according to various grammar rules or machine learning technologies to identify a user's intended commands for the grading assistant service 113 and generate one or more function calls or other computer recognizable commands that can be executed by the grading assistant service 113. Similarly, the natural language processor 119 may also process a text transcript and generate one or more function calls or other computer recognizable commands that can be executed by the virtual assistant service 123.

The virtual assistant service 123 is executed to perform various tasks or services on behalf of a user. Examples of such tasks can include executing other programs or processing commands for other programs on behalf of a user, such as causing the grading assistant service 113 to perform one or more functions on behalf of the user. In some implementations, the virtual assistant service 123 can receive voice commands from a user of the client device 106, cause these voice commands to be processed, and then take an appropriate action in response to the voice command. Examples of virtual assistant services 123 include server side implementations of APPLE SIRI®, AMAZON ALEXA®, GOOGLE NOW™, GOOGLE ASSISTANT™, or MICROSOFT CORTANA®

Also, various data is stored in a data store 126 that is accessible to the computing environment 103. The data store 126 may be representative of a plurality of data stores 126, which can include relational databases, object-oriented databases, hierarchical databases, hash tables or similar key-value data stores, as well as other data storage applications or data structures. The data stored in the data store 126 is associated with the operation of the various applications or functional entities described below. This data can include one or more student records 129, one or more assignment records 133, one or more grade records 136, one or more class records 139, a phoneme library 143, and potentially other data.

A student record 129 represents data associated with individual students of an institution. Accordingly, the student record 129 can include a student identifier 146, student phonemes 149, a student name 153, and potentially other data. The student identifier 146 can be any identifier that uniquely identifies a student with respect to another student, such as a number. Notably, the student name 153 should not be used as a student identifier due to the occasional instance where two students with common names happen to be in the same class or attending the same institution. The student name 153 represents the full, legal name of the student and, potentially, a preferred name or nickname that the student goes by. The student phonemes 149 represent the set of phonemes or other units of sound that, together, form the expected pronunciation of the student name 153.

An assignment record 133 represents data associated with individual assignments for students, such as tests, quizzes, projects, homework assignments, etc. Accordingly, the assignment record 133 can include data such as an assignment identifier 156, assignment phonemes 159, an assignment name 163, a student identifier 146, a grade name 166, and potentially other data. The assignment identifier 156 can be any identifier that uniquely identifies one assignment with respect to another assignment, such as a number or, in some implementations, the assignment name 163. The assignment name 163 represents the name of the assignment represented by the assignment record 133. The assignment phonemes 159 represent the set of phonemes or other units of sound that, together, form the expected pronunciation of the assignment name 163 and other data that uniquely identify the assignment record 133. The student identifier 146 may be stored in an assignment record 133 in order to link an individual assignment record 133 for a particular assignment with a respective student. Likewise, a grade name 166 may be stored in the assignment record 133 to reflect the grade record 136 of the grade that the student received for the assignment.

A grade record 136 represents a grade that can be given for an assignment. Examples of grades include letter grades (e.g., "A, B, C, D, and F"), which can include qualifiers (e.g., "A+, A−, B+, B−, C+, C−, D+, or D−"), or numbers selected from a scale of numbers (e.g., numbers selected from a scale between zero (0) and one-hundred (100)). Accordingly, each grade record can include the grade name 166, which acts as an identifier for the grade, and grade phonemes 169. The grade name 166 may reflect an individual grade. For example, the grade name 166 may be "A-plus" for a grade of an "A+" or "fifty-nine" for a grade of 59/100. The grade phonemes 169 represent the set of phonemes of other sound units that, together, form the expected pronunciation of the grade name 166.

A class record 139 represents data associated with a class of students. Accordingly, the class record 139 can include a class identifier 173, a student list 176, and potentially other data. The class identifier 173 can include any identifier or combination of identifiers that uniquely identifies a class record 139 with respect to another class record 139. The student list 176 can include one or more student identifiers 146 for respective student records 129 of students enrolled in or otherwise registered for a class of the respective class record 139.

The phoneme library 143 represents a record or collection of phonemes or other sound units and respective words or syllables associated with the phoneme or collection of phonemes. The phoneme library 143 may, for example, record that the phoneme "/fɔɹ/" maps separately to the words "for," "four," and "fore" in English dialects or accents that have undergone the horse-hoarse vowel merger, while "/fo(:)ɹ/" instead maps to the words "four" and "fore" in rhotic English dialects or accents that have not undergone the horse-hoarse vowel merger. As a result, reference to the phoneme library 143 can allow a program to determine which word or words may be represented by a given phoneme or set of phonemes.

The client device 106 is representative of a plurality of client devices that may be coupled to the network 109. The client device 106 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, speakers, and similar devices), a videogame console, or other devices with like capability. The client device 106 may include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the client device 106 or may be connected to the client device 106 through a wired or wireless connection. However, other instances of client devices 106 may present information to a user without the use of a display. For example, many client devices 106 have a built-in microphone and speakers, which allow a user to provide voice commands, with results presented using a computer generated voice that is rendered to the user through the speaker.

The client device 106 may be configured to execute various applications such as a virtual assistant client 179 or other applications. The virtual assistant client 179 may be executed to receive inputs from a user, relay the inputs to the virtual assistant service 123, and provide or render results received from the virtual assistant service 123 to the user of the client device 106. The virtual assistant client 179 may include client applications that make use of a graphical user interface (GUI) or a voice-based interface. Examples of virtual assistant clients 179 include client-side implementations of APPLE SIRI®, AMAZON ALEXA®, GOOGLE NOW™, GOOGLE ASSISTANT™, or MICROSOFT CORTANA®. The client device 106 may be configured to execute applications beyond the virtual assistant client 179 such as a grading assistant client 183 or email applications, social networking applications, word processors, spreadsheets, or other applications.

Next, a general description of the operation of the various components of the networked environment 100 is provided. While the following discussion provides an example of the operation of the various components of the networked environment 100, the components may also operate in other arrangements to effect the same or a similar result.

To begin, a user of the client device 106 may activate the virtual assistant client 179. In some instances, the user may activate the virtual assistant client 179 using a voice command to signal an intention to provide the virtual assistant with a request. In other instances, the user may manipulate a portion of the client device 106 (e.g., press or hold a button) to activate the virtual assistant client 179.

Once activated, the user may provide the virtual assistant client 179 with a voice command. Voice commands may be spoken using a structured grammar, or using natural language. As a non-limiting example, the user may say "Assistant, please give Jane Doe an A for today's quiz" or "Assistant, please give John Doe an A for September's book report." In response to the voice command, the virtual assistant client 179 may provide the voice command to the virtual assistant service 123.

The virtual assistant service 123 may then process the voice command to determine how to respond. For example, the virtual assistant service 123 may pass the audio file containing the voice command to the speech converter 116 to turn the audio file into a text transcript. The virtual assistant 123 may then provide the text transcript to the natural language processor 119 to determine the user's intent.

The natural language processor 119 may then perform various natural language processing techniques on the voice command to determine the user's intent. For example, the natural language processor 119 may determine from this first analysis that the user wishes to have the grading assistant service 113 perform an operation or a command. The voice command may then be provided to the grading assistant service 113 by the virtual assistant service 123.

Some implementations, however, may use a dedicated client application in lieu of the virtual assistant client 179. For example, a user may open a grading assistant client application 183 on the client device 106 and provide voice commands to the grading assistant client application 183, which would provide the voice commands directly to the grading assistant service 113.

In any implementation, once the grading assistant service 113 receives the voice command, the grading assistant service 113 could provide the voice command to the speech converter 116 to generate a text-transcript. Once the text-transcript is generated, the grading assistant service 113 could then provide the text transcript to the natural language processor 119 to determine the user's intent. The natural language process 119 could then provide the user's intent or a command based on the user's intent to the grading assistant service 113.

Once the grading assistant service 113 receives the user's intent or a command representing the user's intent from the natural language processor 119, the grading assistant service 113 can execute the command. For example, if the intent or command were to enter a new grade for a student, the grading assistant service might create a new assignment record 133 for the assignment and link a respective grade record 136 and student record 129 to the assignment record 133. Similarly, if the intent or command were to update a student's existing grade (e.g., to correct an error or reflect a student retaking a test or redoing a project), the grading assistant service 113 might update the grade record 136 associated with an existing assignment record 133.

Figure 2:
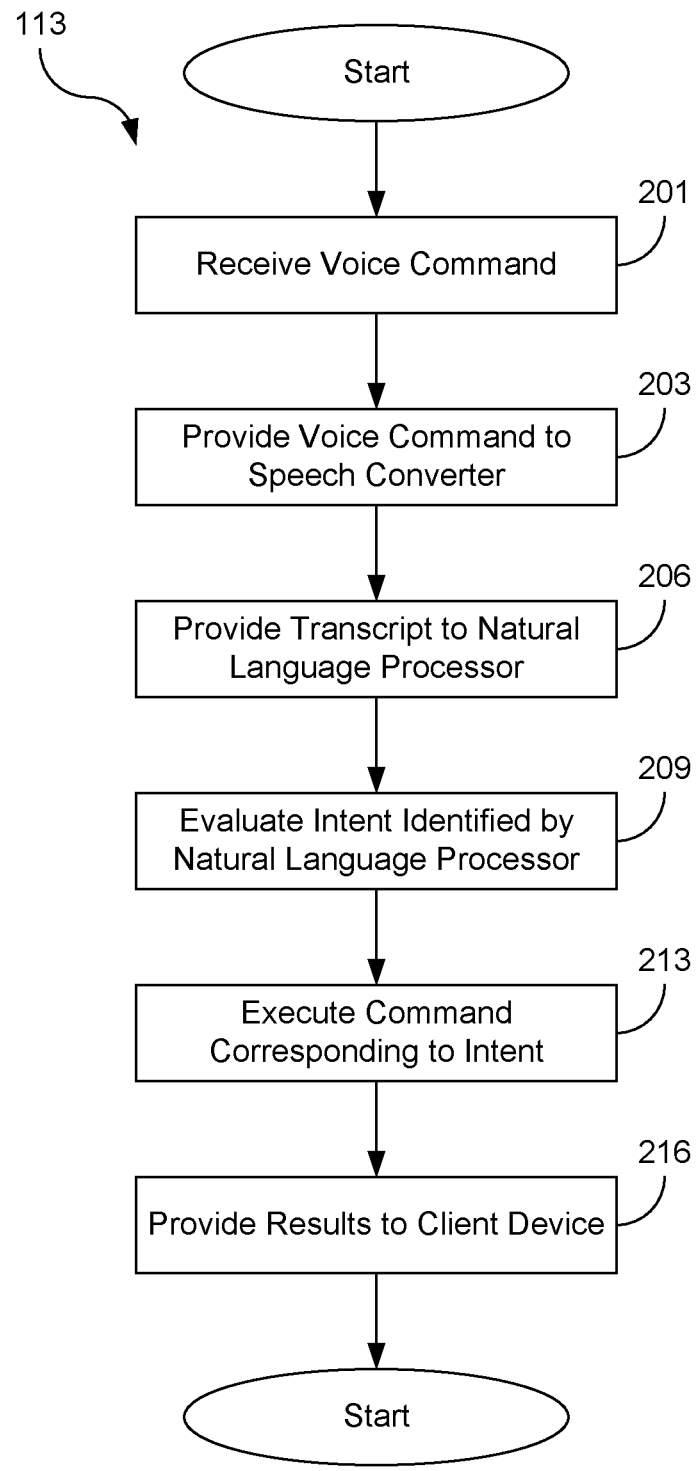
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the grading assistant service 113 according to various embodiments. It is understood that the flowchart of FIG. 2 provides merely an example of the many different types of functional arrangements that may be employed to implement the operation of the portion of the grading assistant service 113 as described herein. As an alternative, the flowchart of FIG. 2 may be viewed as depicting an example of elements of a method implemented in the computing environment 103 (FIG. 1) according to one or more embodiments.

Beginning with box 201, the grading assistant service 113 receives a voice command. In some instances, the voice command may be provided to the grading assistant service 113 by the virtual assistant service 123. In other instances, the voice command may be provided by a grading assistant client application 183 executing on the client device 106.

Next at box 203, the grading assistant service 113 provides the voice command to the speech converter 116 in order to generate a text transcript of the voice command. In response, the grading assistant service 113 receives a text transcript.

Then at box 206, the grading assistant service 113 provides the text transcript to the natural language processor 119 in order to identify the user's intent of the voice command. In response, the natural language processor 119 will provide the user's intent or intended action to the grading assistant service 113. In some instances, this may be provided as a potential command and a set of potential arguments to the command. However, other representations of user intent may also be used by various embodiments of the present disclosure.

Proceeding to box 209, the grading assistant service 113 evaluates the intent or command provided by the natural language processor 119. First, the grading assistant service 113 may evaluate the intent or command to determine if the intent or command is valid. If the intent or command is initially invalid, the grading assistant service 113 may try to process the intent or command further to see if an intelligible or valid command or intent may be extracted from an initially invalid response provided by the natural language processor.

Invalid or unexecutable representations of a valid voice command may often result from phonetic misidentification of homophones or homonyms or near homophones or near homonyms. For example, the natural language processor 119 might provide a response to the grading assistant service 113 indicating that the command or intent is to "enter a grade" of "bee" for the student named "John Doe" instead of "enter a grade" of "B" for the student named "John Doe." The insect "bee" is an obviously improper value for a student's grade.

To resolve or otherwise correct invalid intents received from the natural language processor 119, the grading assistant service 113 can compare invalid values to related entries in the phoneme library 143. To continue the illustrative example, the grading assistant service 113 may first reference the phoneme library 143 to determine that the phoneme for the word "bee" is "/bi/". The grading assistant service 113 could then reference the phoneme library 143 a second time to search for other words that have the phoneme "/bi/." With this example, the grading assistant service 113 could determine that the letter "B," which would be a valid value for a grade, has the same phoneme of "/bi/." The grading assistant service 113 could then use the letter "B" as replacement value for "bee" in the command or intent of "enter a grade" of "B" for the student named "John Doe," which would be a valid command.

The same or similar process can be used to correct other types of errors. For example, mispronounced or misidentified student names (e.g., "John vs. Jon," "Stacy vs. Stacey or Staci") can be correctly identified. In such an example, the grading assistant service 113 might compare the phoneme in a command of a name with the student phonemes 149 of individual student names 153. For instance, if there is a "John Doe" in a class, but the natural language processor 119 returns a command for modifying a record for "Jon Doe," the grading assistant service 113 might compare the phonemes for "Jon Doe" to see if the match the student phonemes 149 for any of the students. Once the grading assistant service 113 determined that the phones for "Jon Doe" match the student phonemes 149 for "John Doe," the grading assistant service 113 could update the command or intent accordingly.

Next at box 213, the grading assistant service 113 executes the command by creating, updating, or deleting appropriate records in the data store 126. This could involve modifying a student's grade, entering a new grade for a new student assignment, creating an assignment record 133 for a new assignment, creating a new student record 129 for a new student, or other commands.

Then at box 216, the grading assistant service 113 provides results to the client device 106. For example, the grading assistant service 113 may provide the results to the virtual assistant service 123, which can relay the results to the virtual assistant client 179. In another example, the grading assistant service 113 may provide the results directly to the grading assistant client 183.

Figure 3:
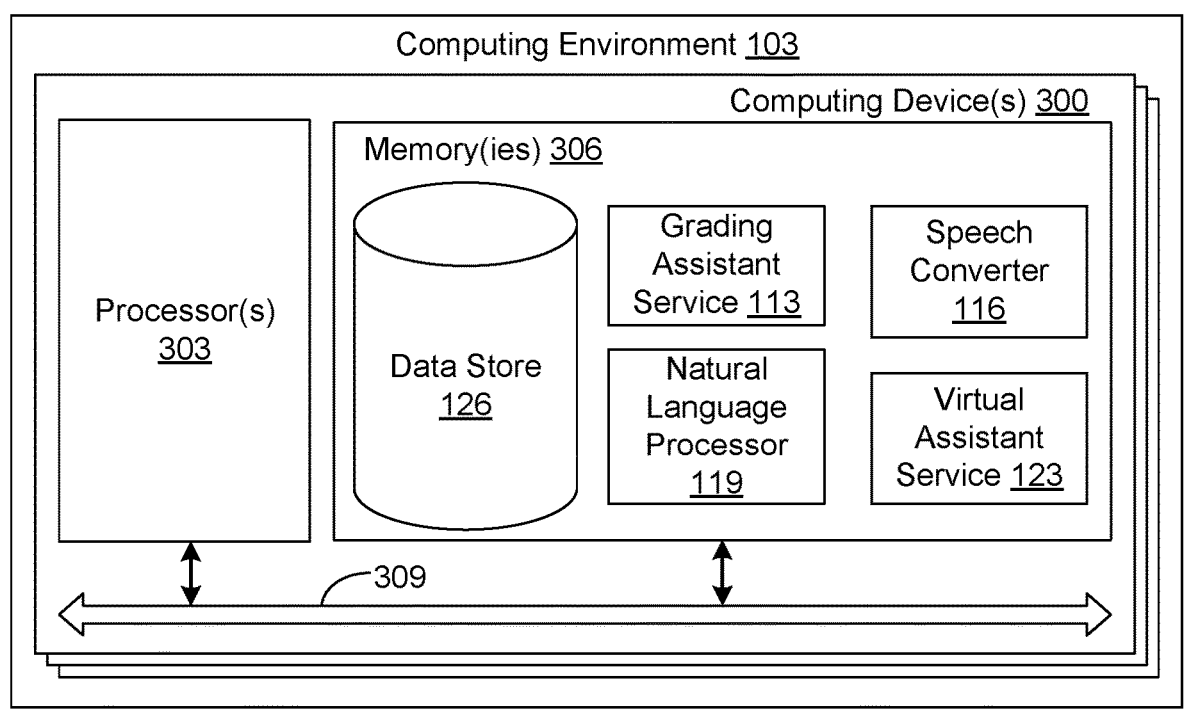
FIG. 3 is a schematic block diagram that provides one example illustration of a computing environment employed in the networked environment of FIG. 1 according to various embodiments of the present disclosure.

With reference to FIG. 3, shown is a schematic block diagram of the computing environment 103 according to an embodiment of the present disclosure. The computing environment 103 includes one or more computing devices 300. Each computing device 300 includes at least one processor circuit, for example, having a processor 303 and a memory 306, both of which are coupled to a local interface 309. To this end, each computing device 300 may include, for example, at least one server computer or like device. The local interface 309 may include, for example, a data bus with an accompanying address/control bus or other bus structure as can be appreciated.

Stored in the memory 306 are both data and several components that are executable by the processor 303. In particular, stored in the memory 306 and executable by the processor 303 are the grading assistant service 113, the speech converter 116, the natural language processor 119, the virtual assistant service 123, and potentially other applications. Also stored in the memory 306 may be a data store 126 and other data. In addition, an operating system may be stored in the memory 306 and executable by the processor 303.

It is understood that there may be other applications that are stored in the memory 306 and are executable by the processor 303 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 303 may represent multiple processors 303 or multiple processor cores and the memory 306 may represent multiple memories 306 that operate in parallel processing circuits, respectively. In such a case, the local interface 309 may be an appropriate network that facilitates communication between any two of the multiple processors 303, between any processor 303 and any of the memories 306, or between any two of the memories 306. The local interface 309 may include additional systems designed to coordinate this communication, including, for example, performing load balancing. The processor 303 may be of electrical or of some other available construction.

Although the grading assistant service 113, the speech converter 116, the natural language processor 119, the virtual assistant service 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 2 shows the functionality and operation of an implementation of portions of the grading assistant service 113. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 303 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the grading assistant service 113, the speech converter 116, the natural language processor 119, the virtual assistant service 123, that includes software or code can be embodied in any non-transitory computer-readable medium for use by or in connection with an instruction execution system such as, for example, a processor 303 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the grading assistant service 113, the speech converter 116, the natural language processor 119, the virtual assistant service 123, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 300, or in multiple computing devices in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:
1. A system, comprising:
a computing device comprising a processor and a memory; and
machine readable instructions stored in the memory that, when executed by the processor, cause the computing device to at least:
receive a voice command that identifies an assignment, a student, and a grade for the student for the assignment, wherein the voice command is stored as an audio file;
convert the voice command to a text file;
parse the text file to identify one or more of the assignment, the student, and the grade;
based on the identification, determine that the one or more of the assignment, the student, and the grade are invalid;
identify one or more phonemes of at least one of the assignment, the student, and the grade;
identify one or more phonemes stored in a data store that identifies a record that matches, within a predefined confidence interval, the one or more phonemes of at least one of the assignment, the student, and the grade;
determine, based on the record associated with the one or more phonemes stored in the data store, a corrected one or more of the assignment, the student, and the grade; and
enter the corrected one or more of the assignment, the student, and the grade for the student for the assignment in the data store.

2. The system of claim 1, wherein the machine readable instructions that cause the computing device to parse the text file to identify the assignment further cause the computing device to at least:

identify a word or phrase with a first phoneme that matches, within a predefined confidence interval, a second phoneme stored in the data store that identifies the assignment.

3. The system of claim 1, wherein the machine readable instructions that cause the computing device to parse the text file to identify the student further cause the computing device to at least:

identify a word or phrase with a first phoneme that matches, within a predefined confidence interval, a second phoneme stored in the data store that identifies the student.

4. The system of claim 1, wherein the machine readable instructions that cause the computing device to parse the text file to identify the grade further cause the computing device to at least:

identify a word or phrase with a first phoneme that matches, within a predefined confidence interval, a second phoneme stored in the data store that identifies the grade.

5. A method, comprising:

receiving, with a first computing device, a voice command from a second computing device that identifies an assignment, a student, and a grade for the student for the assignment, wherein the voice command is stored as an audio file;

converting the voice command to a text file;

parsing the text file to identify one or more of the assignment, the student, and the grade;

determining, based on the identification, that the one or more of the assignment, the student, and the grade are invalid;

identifying one or more phonemes of at least one of the assignment, the student, and the grade;

identifying one or more phonemes stored in a data store that identifies a record that matches, within a predefined confidence interval, the one or more phonemes of at least one of the assignment, the student, and the grade;

determining, based on the record associated with the one or more phonemes stored in the data store, a corrected one or more of the assignment, the student, and the grade; and entering, with the first computing device, the corrected one or more of the assignment, the student, and the grade for the student for the assignment in the data store.

6. The method of claim 5, wherein parsing the text file to identify the assignment further comprises identifying, with the first computing device, a word or phrase with a first phoneme that matches, within a predefined confidence interval, a second phoneme stored in the data store that identifies the assignment.

7. The method of claim 5, wherein parsing the text file to identify the student further comprises identifying, with the first computing device, a word or phrase with a first phoneme that matches, within a predefined confidence interval, a second phoneme stored in the data store that identifies the student.

8. The method of claim 5, wherein parsing the text file to identify the grade further comprises identifying, with the first computing device, a word or phrase with a first phoneme that matches, within a predefined confidence interval, a second phoneme stored in the data store that identifies the grade.

9. A non-transitory, computer-readable medium comprising machine readable instructions that, when executed by a processor of a computing device, cause the computing device to at least:

receive a voice command that identifies an assignment, a student, and a grade for the student for the assignment, wherein the voice command is stored as an audio file;

convert the voice command to a text file;

parse the text file to identify one or more of the assignment, the student, and the grade;

based on the identification, determine that the one or more of the assignment, the student, and the grade are invalid;

identify one or more phonemes of at least one of the assignment, the student, and the grade;

identify one or more phonemes stored in a data store that identifies a record that matches, within a predefined confidence interval, the one or more phonemes of at least one of the assignment, the student, and the grade;

determine, based on the record associated with the one or more phonemes stored in the data store, a corrected one or more of the assignment, the student, and the grade; and enter the corrected one or more of the assignment, the student, and the grade for the student for the assignment in the data store.

10. The non-transitory, computer-readable medium of claim 9, wherein the machine readable instructions that cause the computing device to parse the text file to identify the assignment further cause the computing device to at least:

identify a word or phrase with a first phoneme that matches, within a predefined confidence interval, a second phoneme stored in the data store that identifies the assignment.

11. The non-transitory, computer-readable medium of claim 9, wherein the machine readable instructions that cause the computing device to parse the text file to identify the student further cause the computing device to at least:

identify a word or phrase with a first phoneme that matches, within a predefined confidence interval, a second phoneme stored in the data store that identifies the student.

12. The non-transitory, computer-readable medium of claim 9, wherein the machine readable instructions that cause the computing device to parse the text file to identify the grade further cause the computing device to at least:

identify a word or phrase with a first phoneme that matches, within a predefined confidence interval, a second phoneme stored in the data store that identifies the grade.

\* \* \* \* \*